United States Patent
Bala et al.

(10) Patent No.: US 9,577,557 B2
(45) Date of Patent: Feb. 21, 2017

(54) TURBINE-GENERATOR SYSTEM WITH DC OUTPUT

(71) Applicant: ABB Technology AG, Zurich (CH)

(72) Inventors: Sandeep Bala, Raleigh, NC (US); Darren Tremelling, Cary, NC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/057,613

(22) Filed: Oct. 18, 2013

(65) Prior Publication Data

US 2015/0108761 A1   Apr. 23, 2015

(51) Int. Cl.
| | |
|---|---|
| *B60K 6/10* | (2006.01) |
| *H02P 9/42* | (2006.01) |
| *F01D 15/10* | (2006.01) |
| *H02P 9/00* | (2006.01) |
| *H02J 1/10* | (2006.01) |

(52) U.S. Cl.
CPC ............. *H02P 9/42* (2013.01); *F01D 15/10* (2013.01); *H02J 1/102* (2013.01); *H02P 9/007* (2013.01); *F05D 2220/764* (2013.01); *F05D 2220/7642* (2013.01); *F05D 2220/7644* (2013.01); *F05D 2220/7646* (2013.01); *F05D 2260/85* (2013.01)

(58) Field of Classification Search
USPC ................................................ 290/44; 307/82
See application file for complete search history.

(56) References Cited

U.S. PATENT DOCUMENTS

| | | |
|---|---|---|
| 3,764,815 A | 10/1973 | Habock et al. |
| 3,909,697 A | 9/1975 | Depenbrock |
| 4,335,424 A | 6/1982 | Zabar et al. |
| 5,083,077 A * | 1/1992 | Wallace ................. H02P 9/007 318/729 |
| 5,170,334 A | 12/1992 | Ito et al. |
| 5,446,643 A | 8/1995 | McMurray et al. |
| 5,715,151 A | 2/1998 | Moriura |

(Continued)

FOREIGN PATENT DOCUMENTS

| | | |
|---|---|---|
| CN | 201966683 U | 9/2011 |
| CN | 202172281 U | 3/2012 |

(Continued)

OTHER PUBLICATIONS

Chen, Z., et al., "A Review of the State of the Art of Power Electronics for Wind Turbines," IEEE Transactions on Power Electronics, Aug. 2009, pp. 1859-1875, vol. 24, No. 8, IEEE Power Electronics Society.

(Continued)

*Primary Examiner* — Joseph Waks
(74) *Attorney, Agent, or Firm* — Taft Stettinius & Hollister LLP (57) ABSTRACT

A turbine generator system includes a doubly-fed alternating-current (AC) generator having a first poly-phase circuit (e.g., a stator circuit) and a second poly-phase circuit (e.g., a rotor circuit), a poly-phase AC-to-AC converter circuit coupled between the first and second poly-phase circuits, a poly-phase transformer having input windings coupled to the first poly-phase circuit and having output windings, and a uni-directional rectifier circuit coupled to the output windings of the poly-phase transformer and configured to convert poly-phase AC from the transformer output windings to direct current (DC).

22 Claims, 7 Drawing Sheets

(56) References Cited

U.S. PATENT DOCUMENTS

| | | | |
|---|---|---|---|
| 5,939,793 A * | 8/1999 | Masberg | F01B 27/02 290/38 R |
| 5,994,794 A * | 11/1999 | Wehrlen | H02J 9/066 307/64 |
| 6,434,020 B1 | 8/2002 | Lambert et al. | |
| 6,487,096 B1 | 11/2002 | Gilbreth et al. | |
| 6,958,550 B2 | 10/2005 | Gilbreth et al. | |
| 7,218,012 B1 | 5/2007 | Edenfeld | |
| 7,397,143 B2 | 7/2008 | Walling et al. | |
| 7,449,794 B2 | 11/2008 | Guey et al. | |
| 7,602,074 B2 | 10/2009 | Voss | |
| 7,622,815 B2 * | 11/2009 | Rivas | H02P 9/102 290/44 |
| 7,768,176 B2 * | 8/2010 | Leijon | B60K 6/105 180/65.31 |
| 7,848,120 B2 * | 12/2010 | Lee | H02J 3/18 363/35 |
| 7,952,232 B2 | 5/2011 | Burra et al. | |
| 8,018,083 B2 | 9/2011 | Larsen et al. | |
| 8,138,620 B2 | 3/2012 | Wagoner et al. | |
| 8,174,138 B2 | 5/2012 | Castelli Dezza et al. | |
| 8,188,610 B2 * | 5/2012 | Scholte-Wassink | 290/44 |
| 8,330,296 B2 | 12/2012 | Ottman | |
| 8,436,490 B2 * | 5/2013 | Gertmar et al. | 307/100 |
| 2002/0079706 A1 * | 6/2002 | Rebsdorf et al. | 290/55 |
| 2004/0026929 A1 * | 2/2004 | Rebsdorf et al. | 290/44 |
| 2004/0080164 A1 | 4/2004 | McKelvey et al. | |
| 2006/0192390 A1 | 8/2006 | Juanarena Saragueta et al. | |
| 2007/0132248 A1 * | 6/2007 | Weng et al. | 290/44 |
| 2007/0228836 A1 | 10/2007 | Teichmann | |
| 2008/0001408 A1 | 1/2008 | Liu et al. | |
| 2008/0129120 A1 | 6/2008 | Su et al. | |
| 2008/0252267 A1 | 10/2008 | Lando et al. | |
| 2008/0303489 A1 | 12/2008 | Park et al. | |
| 2009/0230689 A1 | 9/2009 | Burra et al. | |
| 2009/0322083 A1 | 12/2009 | Wagoner et al. | |
| 2010/0045040 A1 * | 2/2010 | Bendixen et al. | 290/44 |
| 2010/0060000 A1 | 3/2010 | Scholte-Wassink et al. | |
| 2010/0124087 A1 | 5/2010 | Falk et al. | |
| 2010/0270864 A1 | 10/2010 | Vyas et al. | |
| 2011/0013441 A1 * | 1/2011 | Gruber et al. | 363/154 |
| 2011/0049994 A1 | 3/2011 | Hiller et al. | |
| 2011/0057443 A1 * | 3/2011 | Rivas et al. | 290/44 |
| 2011/0057631 A1 | 3/2011 | Dalessandro et al. | |
| 2011/0140534 A1 | 6/2011 | Yasugi | |
| 2011/0175355 A1 * | 7/2011 | Rosenvard | F03D 7/048 290/44 |
| 2011/0291479 A1 | 12/2011 | Lee | |
| 2012/0139246 A1 | 6/2012 | Rafoth et al. | |
| 2012/0280665 A1 * | 11/2012 | Su et al. | 322/89 |
| 2012/0286512 A1 | 11/2012 | Biellmann et al. | |
| 2013/0009477 A1 * | 1/2013 | DeLattre | H02J 9/062 307/46 |
| 2013/0016537 A1 * | 1/2013 | Deng | 363/34 |
| 2013/0027994 A1 * | 1/2013 | Nelson et al. | 363/40 |
| 2013/0082628 A1 | 4/2013 | Takegami et al. | |
| 2013/0113212 A1 | 5/2013 | Sakamoto et al. | |
| 2013/0154264 A1 | 6/2013 | Hatanaka et al. | |
| 2013/0181688 A1 * | 7/2013 | Tupper et al. | 322/61 |
| 2013/0184884 A1 | 7/2013 | More et al. | |
| 2013/0193766 A1 * | 8/2013 | Irwin et al. | 307/82 |
| 2013/0200617 A1 | 8/2013 | Smith et al. | |
| 2013/0200620 A1 | 8/2013 | Gupta et al. | |
| 2013/0208522 A1 | 8/2013 | Monjean et al. | |
| 2013/0264882 A1 | 10/2013 | Abasolo et al. | |
| 2013/0285491 A1 | 10/2013 | Kuznetsov et al. | |
| 2013/0343111 A1 * | 12/2013 | Nelson | 363/171 |
| 2014/0152109 A1 | 6/2014 | Kanakasabai et al. | |
| 2014/0225369 A1 | 8/2014 | Bodewes et al. | |
| 2014/0244056 A1 * | 8/2014 | Pena | F02C 1/00 700/287 |
| 2014/0268942 A1 * | 9/2014 | Jiang Hafner | H02J 3/36 363/53 |
| 2015/0001848 A1 | 1/2015 | Imaie et al. | |
| 2015/0229121 A1 * | 8/2015 | Davidson | H03K 17/0828 361/54 |
| 2015/0263526 A1 * | 9/2015 | Kjær | H02J 3/386 290/44 |

FOREIGN PATENT DOCUMENTS

| | | |
|---|---|---|
| EP | 2114001 A1 | 4/2009 |
| EP | 2166225 A1 | 3/2010 |
| EP | 2283233 B1 | 5/2011 |
| EP | 2565443 A1 | 3/2013 |
| JP | 6249828 A | 3/1987 |
| WO | 0125628 A2 | 4/2001 |
| WO | 2009110648 A1 | 9/2009 |
| WO | 2011058170 A1 | 5/2011 |
| WO | 2011124258 A1 | 10/2011 |
| WO | WO 2011124258 A1 * | 10/2011 |
| WO | 2012026026 A1 | 3/2012 |
| WO | 2012103894 A2 | 8/2012 |

OTHER PUBLICATIONS

Fletcher, J., et al., "Introduction to Doubly-Fed Induction Generator for Wind Power Applications," Paths to Sustainable Energy, Dec. 30, 2010, pp. 259-278, InTech.

Keshavarz, S. "Design and Evaluation of an Active Rectifier for a 4.1 MW Off-Shore Wind Turbine," Master of Science Thesis, Chalmers University of Technology, 2011, pp. a-42, Göteborg, Sweden.

Pekarek, S., et al., "ACSL/Graphic Modeller component models for electric power education," IEEE Transactions on Education, Nov. 1998, Subsection D. "Six-pulse bride rectifier," vol. 41, No. 4, IEEE Education Society.

Xiang, D. et al., "Coordinated Control of an HVDC Link and Doubly Fed Induction Generators in a Large Offshore Wind Farm", IEEE Transactions on Power Delivery, vol. 21, No. 1, Jan. 2006, pp. 463-471.

Zargari, Navid R. et al., "A Multilevel Thyristor Rectifier with Improved Power Factor", IEEE Transactions on Industry Applications, vol. 33, No. 5, Sep./Oct. 1997, 1208-1213.

\* cited by examiner

Prior Art

TURBINE-GENERATOR SYSTEM WITH DC OUTPUT

TECHNICAL FIELD

The present disclosure is generally related to electric power generating systems, and is more particularly related to generator systems having a direct-current (DC) output.

BACKGROUND

After more than a decade of rapid growth, interest in wind energy continues to grow. Zhe Chen et al., "A Review of the State of the Art of Power Electronics for Wind Turbines," IEEE Transactions on Power Electronics, Vol. 24, No. 8, August 2009, provides an overview of the technology used for energy generation from wind, as of 2009. According to the Chen article, early wind generation generally used squirrel-cage induction generators connected directly to the alternating-current (AC) grid, but technical development has shifted towards generation technology that supports variable speeds.

Figure 1:
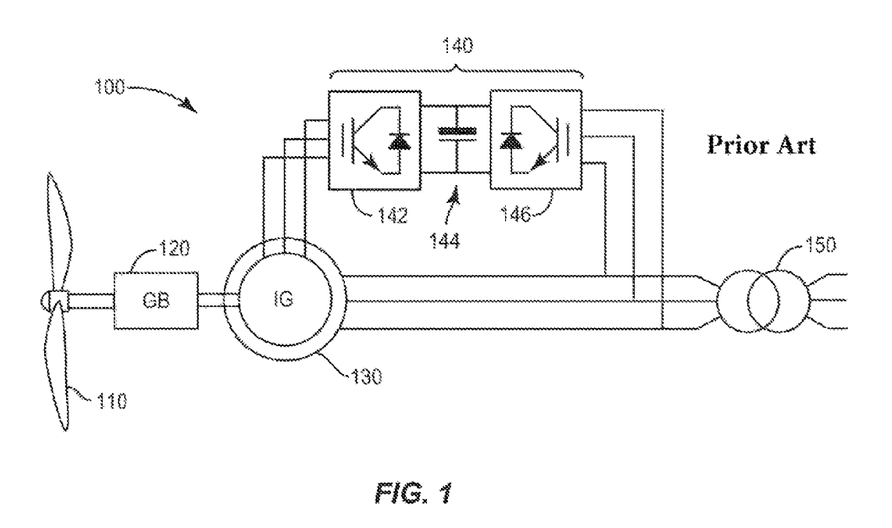
FIG. 1 illustrates components of a conventional wind-based power generation system.

FIG. 1 illustrates the basic elements of a typical variable-speed, wind-based generation system 100. A blade 110 is connected to a doubly-fed induction generator 130 through a gearbox 120. The three-phase stator terminals are coupled to the AC grid through a transformer 150. An AC-AC converter 140 is connected between the rotor terminals and the stator terminals. In more detail, the AC-AC converter includes a rotor-side DC-AC converter 142 and a stator-side AC-DC converter (i.e., a three-phase rectifier) 146 connected together via their respective DC sides. A capacitor 144 is positioned between the two converters, and reduces the variations in the DC-link voltage while providing an energy buffer between the two converters.

The frequency and voltage of the induction generator output vary as the speed of the generator changes. The AC-AC converter allows this variable-voltage, variable-frequency output of the generator to be converted into a fixed-frequency, fixed-voltage output that can be coupled directly to the AC grid. More particularly, the rotor-side converter 142, which is effectively a three-phase inverter circuit, applies a voltage to the rotor windings of the doubly-fed induction generator 130, and controls the rotor currents so that the rotor flux maintains an optimal position relative to the stator flux, for a given torque at the generator shaft. The stator-side converter 146, which is effectively a three-phase rectifier circuit, regulates the voltage of the DC link, at capacitor 144, and generates or absorbs reactive power as needed. An extensive tutorial on the operation of the doubly-fed induction generator in the context of wind power can be found in John Fletcher and Jin Yang, "Introduction to the Doubly-Fed Induction Generator for Wind Power Applications," *Paths to Sustainable Energy*, Dr. Artie Ng (Ed.), InTech (2010), available at: http://www.intechopen.com/books/paths-to-sustainable-energy/introduction-to-the-doubly-fed-inductiongenerator-for-wind-power-applications.

Figure 2:
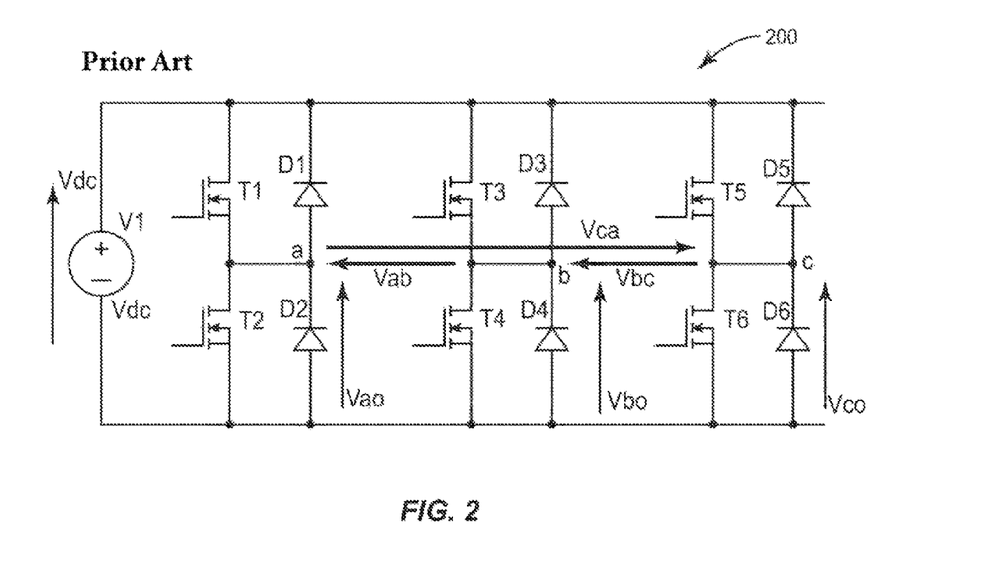
FIG. 2 is a schematic diagram illustrating a six-switch voltage source inverter circuit.

The power electronics in a wind generator system, such as the AC-AC converter 140 of FIG. 1, are a costly and critical element. FIG. 2 illustrates a typical bi-directional voltage source inverter circuit 200, which might be used as shown for DC-AC converter 146 in FIG. 1. A similar circuit, but reversed from right to left, can be used as the AC-DC converter 142 in FIG. 1 Each of the three phases from the AC side are connected to the center of a respective bridge leg, at the nodes marked a, b, and c. This six-switch inverter topology typically uses insulated-gate bipolar transistors (IGBTs) for high power-handling capability. The details of its operation and use in AC-AC converters are well known and are described in the Fletcher and Yang reference identified above.

The system illustrated in FIG. 1 comprises a doubly-fed induction generator (DFIG), an AC-AC converter, and a transformer. Other approaches to wind-based power generation systems have been developed, including, for example, systems based on a permanent magnet (PM) generator, an AC-AC converter, and a transformer. However, one drawback to these systems is their increased cost, due to the use of permanent magnets. More recently, still other approaches have been proposed in which AC power generated from a PM generator is converted to DC power for connection to a DC grid. These solutions likewise suffer from relatively high cost, due at least in part to the use of the PM generator. Accordingly, improved systems that have low cost and high performance are needed.

SUMMARY

Embodiments of the present invention include a turbine generator system that includes a doubly-fed alternating-current (AC) generator having a first poly-phase circuit (e.g., a stator circuit) and a second poly-phase circuit (e.g., a rotor circuit), a poly-phase AC-to-AC converter circuit coupled between the first and second poly-phase circuits, a poly-phase transformer having input windings coupled to the first poly-phase circuit and having output windings, and a uni-directional rectifier circuit coupled to the output windings of the poly-phase transformer and configured to convert poly-phase AC from the transformer output windings to direct current (DC).

In various embodiments, the doubly-fed AC generator is one of the following: a wound-rotor induction generator with slip rings; a dual-stator, squirrel-cage induction generator; and a wound-rotor induction generator with brushless excitation. In some embodiments, the AC-to-AC converter circuit is an indirect converter comprising a poly-phase AC-to-DC converter (i.e., a poly-phase rectifier), a poly-phase DC-to-AC converter (i.e., a poly-phase inverter), and a DC link between the poly-phase AC-to-DC converter and the poly-phase DC-to-AC converter. The AC-to-AC converter is configured to convert a variable-voltage, variable-frequency, output of the rotor circuit to a substantially fixed frequency output at the input windings of the poly-phase transformer, in some embodiments. The substantially fixed frequency output may be at a frequency between about 40 Hz and about 600 Hz, for example. In some embodiments, the substantially fixed frequency output is at a frequency greater than about 100 Hz, allowing a reduction of size in the transformer, compared to systems that operate at a grid frequency of 50 or 60 Hz. The converter circuit has a power rating of less than about 40% of the power rating of the doubly-fed AC generator, in some embodiments.

Some embodiments of the turbine generator system include a backup power source coupled to the AC generator and configured to power the turbine generator system during startup. This backup power source may comprise one of the following, for example: a battery coupled to the AC generator via a battery inverter circuit; a flywheel mechanically coupled to the AC generator; and a combination of a battery and flywheel, wherein the battery is arranged to power the flywheel and the flywheel is mechanically coupled to the AC generator. Some embodiments may comprise a grid-fault protection circuit configured to de-energize the second polyphase circuit in the event of a fault on the DC side of the rectifier circuit. In some of these and in other embodiments, the rectifier circuit is connected to the output windings of the poly-phase transformer via a protection device.

Other embodiments of the present invention include a power generation system comprising multiple turbine generator systems configured to provide direct current (DC) power via respective DC buses, and a collection circuit connected to each of the DC buses and configured to combine the provided DC power. In these embodiments, each of one or more of the turbine generator systems comprises a doubly-fed alternating-current (AC) generator having a first poly-phase circuit (e.g., a stator circuit) and a second poly-phase circuit (e.g., a rotor circuit), a poly-phase AC-to-AC converter circuit coupled between the first and second poly-phase circuits, a poly-phase transformer having input windings coupled to the first poly-phase circuit and having output windings, and a uni-directional rectifier circuit coupled to the output windings of the poly-phase transformer and configured to convert poly-phase AC from the transformer output windings to direct current (DC).

Embodiments of the present invention extend not only to turbine generator systems like those summarized above, but also to corresponding methods for providing and operating systems. Those skilled in the art will recognize still further embodiments, as well as additional features and advantages of several of these embodiments, upon reading the following detailed description and upon viewing the accompanying drawings.

BRIEF DESCRIPTION OF THE DRAWINGS

The components in the figures are not necessarily to scale, instead emphasis being placed upon illustrating the principles of the invention. Moreover, in the figures, like reference numerals designate corresponding parts. In the drawings.

DETAILED DESCRIPTION

In the claims and discussion that follow, terms such as "first", "second", and the like, are used to differentiate between several similar elements, regions, sections, etc., and are not intended to imply a particular order or priority unless the context clearly indicates otherwise. Furthermore, as used herein, the terms "having", "containing", "including", "comprising" and the like are open-ended terms that indicate the presence of stated elements or features but that do not preclude additional elements or features. Likewise, the use of the singular articles "a", "an" and "the" are not intended to preclude the presence of additional ones of the referenced item. Like terms refer to like elements throughout the description.

With regards to the figures, it will be appreciated that several of the figures are schematics that include poly-phase components and connections. While these poly-phase components and connections may typically be three-phase elements, as commonly used in power generation systems, other configurations, such as six-phase or twelve-phase systems, are possible. For simplicity, the figures illustrate many of the multi-phase electrical connections with a single line—it will be appreciated that these connections will actually comprise multiple conductors, e.g., three or four conductors in the case of a three-phase system.

Figure 3:
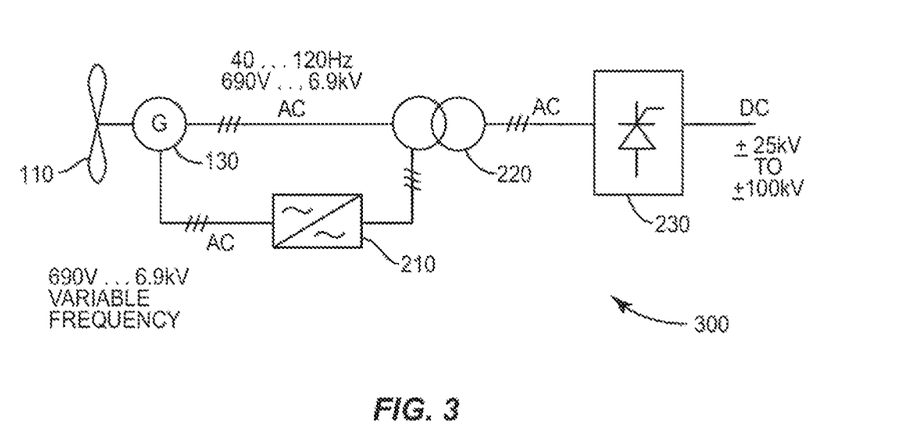
FIG. 3 is a schematic diagram illustrating an example turbine generator system according to some embodiments of the present invention.

FIG. 3 illustrates a turbine-generator system 300 according to some embodiments of the present invention. Turbine-generator system 300 includes a doubly-fed AC generator 130, which may typically be a three-phase generator (as shown in FIG. 3), but more generally is a poly-phase generator. Generator 130 has two poly-phase circuits configured for connection to other components—these may be a stator circuit and a rotor circuit in a conventional generator, but, as explained in further detail below, these may instead be a pair of stator circuits or a stator circuit and a brushless rotor exciter circuit in other types of generators. Generally speaking, these two poly-phase circuits can operate at different frequencies and/or AC voltages.

A poly-phase AC-AC converter 210 is coupled between a first one of the generator's poly-phase circuits (e.g., the stator circuit) and the generator's second poly-phase circuit (e.g., the rotor windings), while a poly-phase transformer 220 has input windings coupled to the generator's first poly-phase circuit and output windings coupled to a uni-directional rectifier circuit 230. Uni-directional rectifier circuit 230 is configured to convert poly-phase AC from the transformer output windings to direct current, e.g., for distribution via a DC grid. Note that "uni-directional," as that term is used herein to describe a rectifier circuit, means that the DC output of the rectifier can only flow in a single direction.

In some embodiments, all of the electrical components shown in FIG. 3, i.e., the generator 130, poly-phase AC-AC converter 201, transformer 220, and rectifier circuit 230, may be housed in a single enclosure, e.g., in a housing on a wind station tower, or in the tower itself. In other embodiments, some of the electrical components, such as the AC-AC converter 210, transformer 220, and rectifier circuit 230, are co-located with the generator 130, but may be housed in an enclosure separate from the generator 130, e.g., in a housing at or near a tower supporting the wind-driven blade 110 and generator 130.

While FIG. 3 illustrates direct connections between the AC generator 130, the AC-AC converter 210, the transformer 220, and the rectifier circuit 230, any one or more of these connections may be through a protection device and/or monitoring device, in some applications. Accordingly, it should be understood that these components are "coupled to" one another, where "coupled to" can refer to a direct electrical connection as well as to an electrical connection that passes through a protective device, such as a switch or circuit breaker, or through a monitoring device, or through another device that does not substantially modify the voltage or current. For clarity, it should be understood that the term "coupled to," as used to describe the present turbine generator systems, does not encompass electrical connections that cover large distances, relative to the size of a typical wind-powered generator installation, e.g., distances exceeding hundreds of meters.

Figure 4:
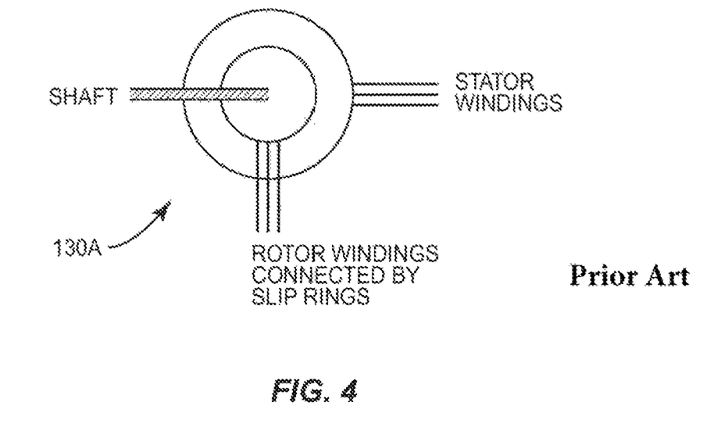
FIG. 4 illustrates a wound-rotor induction generator with slip rings.
Figure 5:
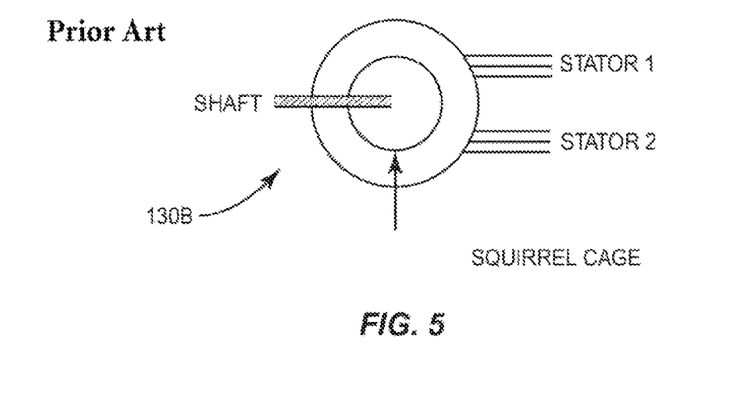
FIG. 5 illustrates a dual-stator winding, squirrel cage induction generator.
Figure 6:
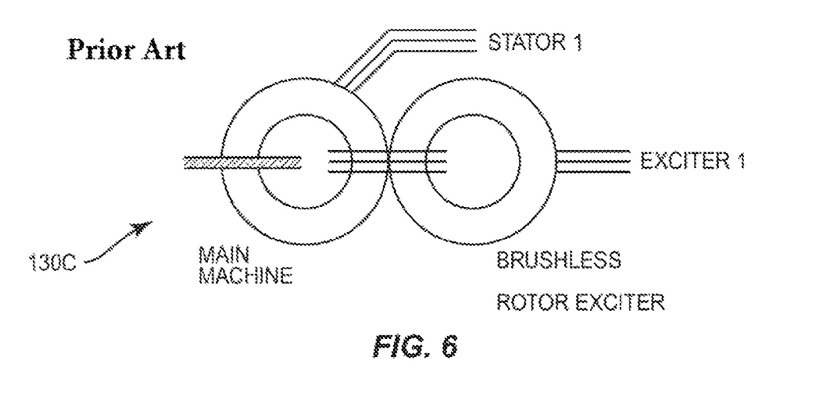
FIG. 6 illustrates a wound-rotor induction generator with brushless excitation.

The doubly-fed AC generator 130 shown in FIG. 3 may be of several different configurations. In some embodiments, for example, the doubly-fed AC generator is a wound-rotor induction generator with slip rings. An example is the doubly-fed AC generator 130A shown in FIG. 4. In other embodiments, a dual-stator, squirrel-cage induction generator may be used instead. An example is the doubly-fed AC generator 130B illustrated in FIG. 5. Still other embodiments may use a wound-rotor induction generator with brushless excitation—an example is the doubly-fed AC generator 130C shown in FIG. 6. For simplicity, the operation of the system shown in FIG. 3 is described below with respect to a doubly-fed AC generator having a rotor circuit and stator circuit. However, it should be understood that different types of poly-phase circuits may be substituted for the rotor and/or stator circuits, depending on the specific generator that is used.

Because the output voltage of the doubly-fed induction generator 130 is actively regulated by the AC-AC converter 210 connected between the rotor and stator of the generator, the AC voltage output by transformer 220 can be nearly constant in magnitude. As a result, the uni-directional rectifier circuit 230 coupled to the output windings of the poly-phase transformer 220 can be a simple (albeit high-power) diode-based rectifier, such as a multi-pulse bridge rectifier circuit. Alternatively, the rectifier circuit 230 may be a thyristor bridge circuit, or another controllable rectifier topology. The DC output of the uni-directional rectifier circuit 230 can supply a medium- or high-voltage DC collection grid. Accordingly, rectifier circuit 230 may be designed to output a DC voltage between ±25 kilovolts (kV) and ±100 kV, in some embodiments. It will be appreciated that the transformer 220 is configured to step up the output voltage from the AC generator 130 to an appropriate voltage for efficient rectification.

Figure 7:
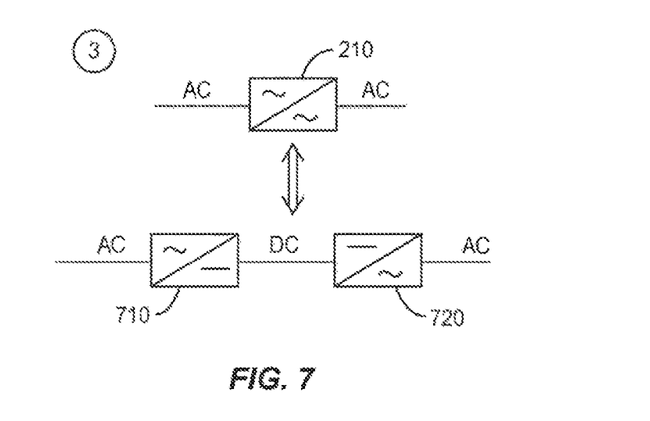
FIG. 7 shows the implementation of an AC-to-AC converter as a poly-phase rectifier, a poly-phase inverter, and an intermediate DC link.

In some embodiments, the AC-to-AC converter circuit 210 shown in FIG. 3 is an indirect AC-to-AC converter comprising a poly-phase AC-to-DC-converter, a poly-phase DC-to-AC converter, and a DC link between the poly-phase AC-to-DC converter and the poly-phase DC-to-AC converter. This is shown in FIG. 7, which illustrates the equivalence between an AC-to-AC converter 210 and an indirect converter topology comprising a poly-phase AC-to-DC converter 710, i.e., a poly-phase rectifier, and a DC-to-AC converter 720, i.e., a poly-phase inverter, with a DC link between them. In a three-phase converter, the six-switch inverter topology shown in FIG. 2 may be used for either or both of AC-to-DC converter 710 or DC-to-AC converter 720. In other poly-phase systems, the six-switch topology can be easily extended, e.g., to handle six or twelve phases. Other converter topologies may be used, as well.

The AC-to-AC converter 210 shown in FIG. 3 is configured to convert a variable-voltage, variable-frequency output of the rotor windings to a substantially fixed frequency output at the input windings of the poly-phase transformer. The frequency at the rotor circuit may vary over a wide range, depending on the operating conditions for the turbine generator. In a doubly-fed induction generator, the rotor frequency can be up to about 30% of the stator frequency. For example, if the stator frequency is 60 Hz, the rotor frequency could be as low as 1 Hz or less, and as high as about 18 Hz. Because the generator system 300 is not connected to an AC grid, the machine output frequency is not tied to the frequency of the AC transmission grid. As a result, the fixed frequency on the stator side of AC-to-AC converter 210 is a design choice. Further, because the generator system 300 is not connected to an AC grid, the frequency control does not need to be particularly tight. For this reason, the output of the AC-to-AC converter 210 is referred to herein as having a "substantially" fixed frequency—this should be understood to mean that the frequency is controlled but may vary somewhat, perhaps as much as 10-20%, from a nominal fixed-frequency operating point.

This flexibility in setting the fixed frequency of the AC-to-AC converter is a distinct advantage over the conventional AC-connected wind generator system shown in FIG. 1. It is possible, for example, to set the nominal fixed frequency to a frequency between 40 Hz and about 600 Hz, for example. However, it can be particularly advantageous, in some systems, to set the fixed frequency to a frequency greater than about 100 Hz, or even higher, as the higher machine output frequency allows for the use of a smaller-sized transformer 220, thus reducing cost and allowing for a smaller overall equipment size.

Another advantage of the configuration shown in FIG. 3 is that there are no VAR management requirements imposed by AC grid codes, since the generator system 300 is completely isolated from any AC grid. This means that the doubly-fed induction generator 130, converter 210, and transformer 220 can be optimized for size. For example, the AC-AC converter 210 can be partially-rated, e.g., rated to less than about 40% of the turbine power. The AC-AC converter can be rated at as low as 30% of the turbine power, in some embodiments, compared to the 50% rating that is needed in a conventional system. The end result is lower cost, and more efficient operation.

Figure 8:
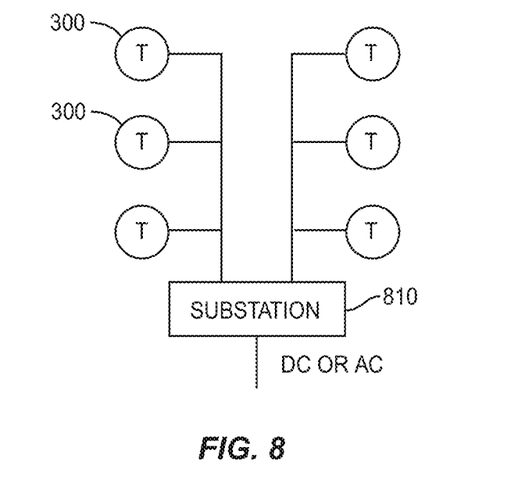
FIG. 8 illustrates an example system in which DC power is aggregated from multiple turbine generator systems.

The outputs from multiple systems of the sort described above may be combined, to aggregate the power produced by multiple generating systems. A so-called wind farm, for example, may comprise several wind-driven generating systems as shown in FIG. 3, with the DC outputs from the several systems tied directly together and/or combined in a collection circuit housed in a nearby substation. FIG. 8 illustrates one possible configuration, where the DC buses from several systems 300 are tied directly together and fed to a substation 810. Substation 810 is configured to combine the DC power thus collected, and may be further configured to convert the collected DC power to another DC voltage or to an AC voltage, for supplying to a distribution grid.

Figure 9:
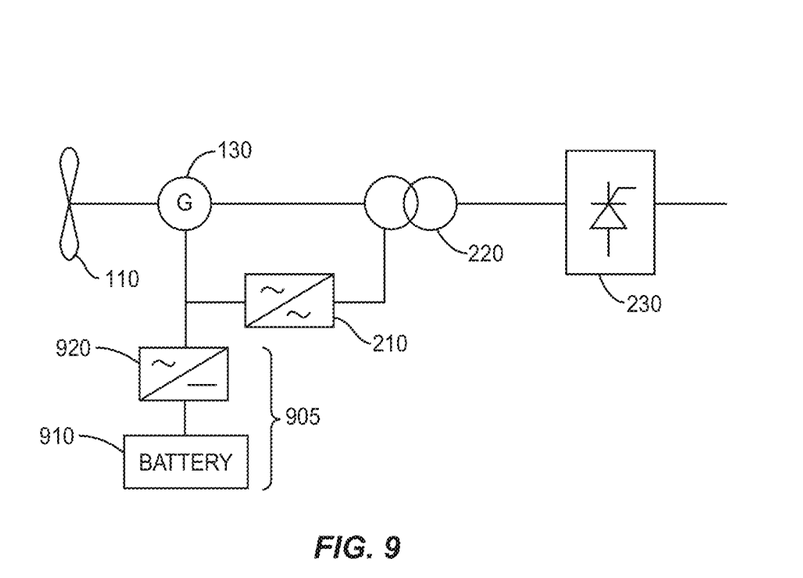
FIGS. 9, 10, and 11 illustrate examples of systems with backup power supply systems.
Figure 10:
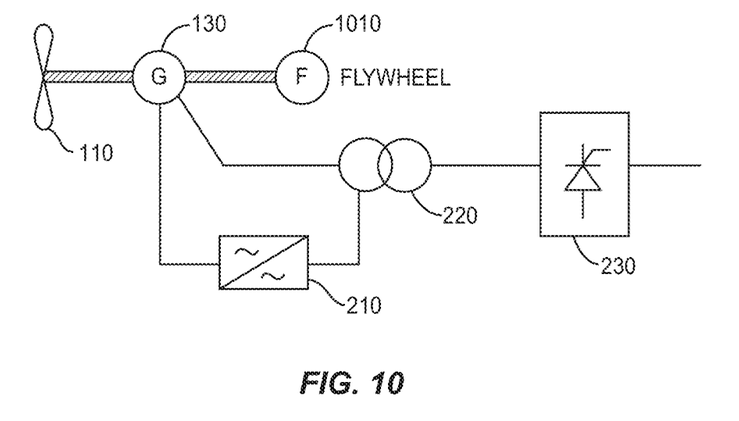
Figure 11:
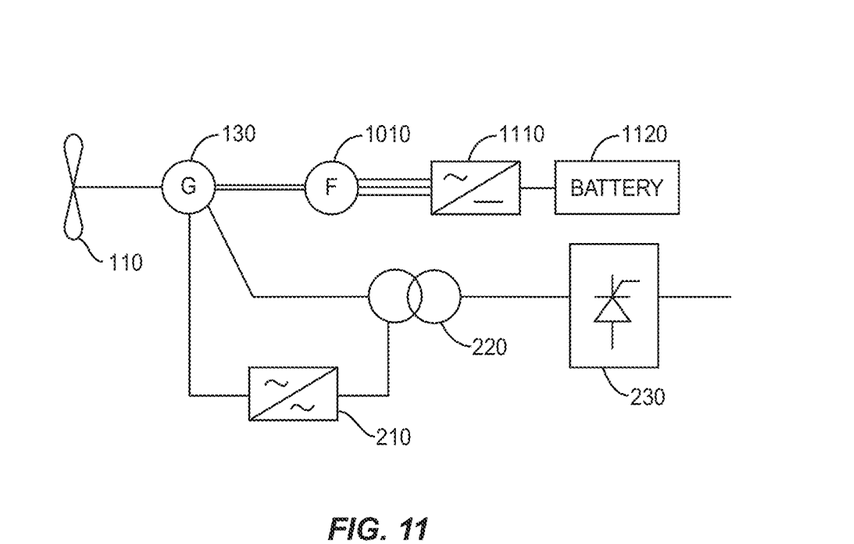

Because a generator system as described above is not connected to the AC grid and cannot receive DC power from the grid through the uni-directional rectifier circuit 230, a power source is needed to power the system during startup. Accordingly, various embodiments of the present invention comprise a backup power source coupled to the AC generator and configured to power the generator system during startup or during re-start. The backup power source can be one of any of a variety of types. One example is shown in FIG. 9, where a backup power source 905 comprises a battery 910 coupled to the AC generator 130 via battery inverter circuit 920. Another possibility is shown in FIG. 10, where a flywheel 1010 is mechanically coupled to the AC generator 130. Combinations of these approaches are possible, of course. Another possible configuration is shown in FIG. 11, where flywheel 1010, which is mechanically coupled to AC generator 130, can be electrically powered by the combination of battery 1120 and inverter circuit 1110. It will be appreciated that the flywheel 1010 can be used to recharge the battery 1120 during periods of normal operation.

Figure 12:
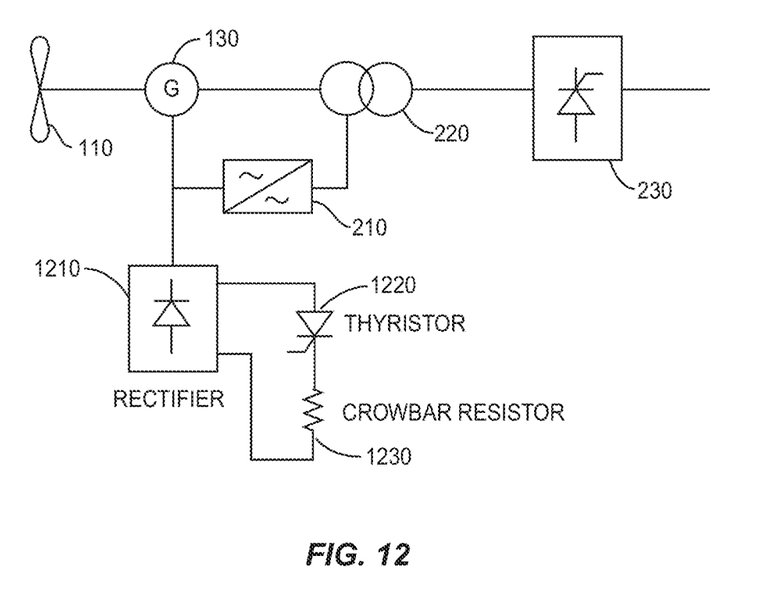
FIG. 12 shows a turbine generator system with a fault-protection circuit.

The systems described above may also be augmented with protective devices or circuits, such as to circuits designed to control the machine field in the case of grid faults, to minimize stress on the turbine and to limit fault currents. One such circuit is shown in FIG. 12, in which a rectifier circuit 1210 is combined with a thyristor 1220 and crowbar resistor 1230. This circuit is configured to de-energize the rotor circuit in the event of a fault on the DC side of the rectifier circuit. This is done by firing the thyristor and dissipating energy in the crowbar resistor. As another example, a protection device, e.g., a circuit breaker, may be installed between the output windings of transformer 220 and the rectifier circuit 230, to isolate the generator system from the DC grid in the event of a fault on the DC side of the rectifier circuit. Grid-fault protection circuits configured to de-energize the rotor circuit (or other poly-phase circuit) may include any of the above, or may include a control processor configured to de-energize the rotor circuit using existing circuitry, or a combination of both.

It will be appreciated that other variations and combinations of the detailed systems described above are possible. For instance, although the systems described above were explained and illustrated in the context of wind-driven turbine generators, the systems can be adapted for other turbine-based generator systems, such as tidal farms.

Embodiments of the present invention extend not only to turbine generator systems such as those detailed above, but also to methods for operating such systems. FIG. 11 is a process flow diagram illustrating an example of such embodiments, i.e., a method for direct-current (DC) power generation. As shown at block 1110, the illustrated method includes providing a doubly-fed alternating-current (AC) generator having a first poly-phase circuit (e.g., a stator circuit) and a second poly-phase circuit (e.g., a rotor circuit) and having a poly-phase AC-to-AC converter circuit coupled between the first and second poly-phase circuits, such that the doubly-fed AC generator and the converter circuit are configured to provide a substantially fixed-frequency voltage output. As shown at block 1120, the voltage level from the fixed-frequency voltage output is increased sufficiently to provide power to a DC transmission line, e.g., using a transformer that is co-located with the doubly-fed AC generator. Next, as shown at block 1130, the increased voltage is converted to a DC voltage, using a rectifier circuit that is co-located with the doubly-fed AC generator and the converter circuit. The output of the rectifier circuit is applied to a DC transmission line, as shown at block 1140.

Figure 13:
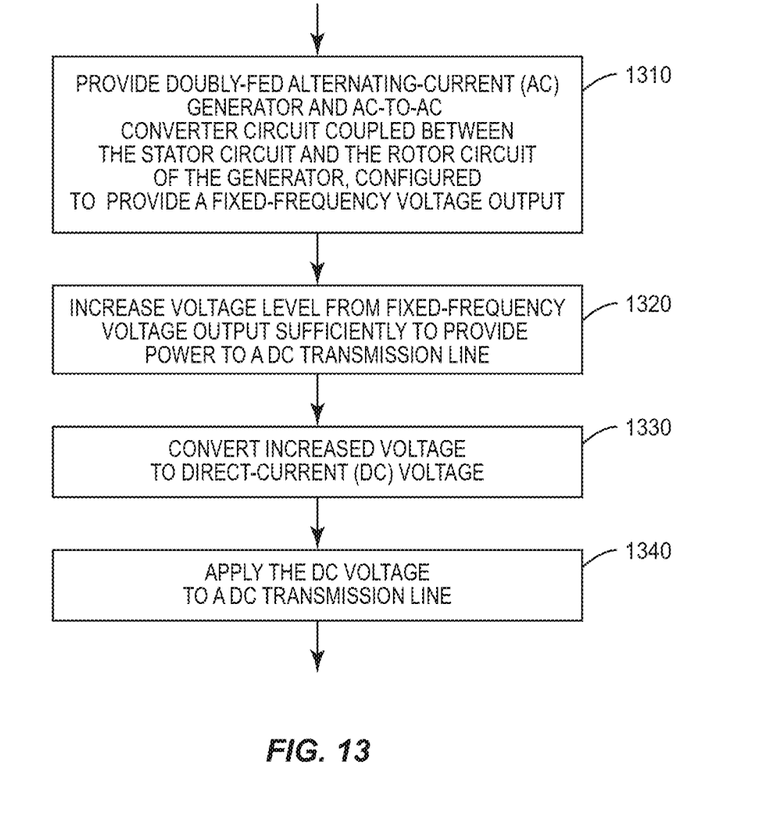
FIG. 13 is a process flow diagram illustrating an example method for DC power generation.

The several variations of the systems described above are applicable as well to the method illustrated in FIG. 13. Accordingly, the doubly-fed AC generator may be one of the following, in various embodiments: a wound rotor induction generator with slip rings; a dual-stator, squirrel-cage induction generator; and a wound-rotor induction generate with brushless excitation.

In some embodiments, increasing the voltage level from the fixed-frequency voltage output comprises providing a poly-phase transformer having input windings coupled to the stator circuit of the AC generator and having output windings coupled to the uni-directional rectifier circuit. In some of these and in some other embodiments, converting the increased voltage to a direct-current (DC) voltage comprises providing a uni-directional rectifier circuit co-located with the AC-to-AC converter circuit and the transformer, coupled to the output windings of the poly-phase transformer, and configured to convert AC from the transformer output windings to direct current (DC).

As discussed above, the AC-to-AC converter circuit may be an indirect converter comprising a poly-phase AC-to-DC converter, a poly-phase DC-to-AC converter, and a DC link between the poly-phase AC-to-DC converter and the poly-phase DC-to-AC converter. The AC-to-AC converter circuit is configured to convert a variable voltage, variable frequency, output of the rotor windings to a substantially fixed frequency output at the input windings of the three-phase transformer, in some embodiments. This fixed frequency output may be at a frequency between about 100 Hz and about 600 Hz, for example. The AC-to-AC converter circuit may have a power rating of less than about 40% of the power rating of the doubly-fed AC generator.

Some embodiments of the method illustrated in FIG. 13 may further comprise providing a backup power source coupled to the AC generator and configured to power the turbine generator system during startup. In various embodiments, this backup power source may comprise one of: a battery coupled to the AC generator via a battery inverter circuit; a flywheel mechanically coupled to the AC generator; and a combination of a battery and flywheel, wherein the battery is arranged to power the flywheel and the flywheel is mechanically coupled to the AC generator.

Of course, it should be understood that the present invention is not limited by the foregoing description, nor is it limited by the accompanying drawings. Instead, the present invention is limited only by the following claims and their legal equivalents. With the above-described circuits, systems, methods, and other variations and extensions in mind, those skilled in the art will appreciate that the foregoing description and the accompanying drawings represent non-limiting examples of the systems and apparatus taught herein. As such, the present invention is not limited by the foregoing description and accompanying drawings. Instead, the present invention is limited only by the following claims and their legal equivalents.

What is claimed is:

1. A turbine generator system, comprising:
   a doubly-fed alternating-current (AC) generator having a first poly-phase circuit and a second poly-phase circuit;
   a poly-phase AC-to-AC converter circuit coupled between the first poly-phase circuit and the second poly-phase circuit configured to produce a substantially fixed frequency voltage output;
   a poly-phase transformer having input windings coupled to the first poly-phase circuit and having output windings, wherein the poly-phase transformer is configured to increase, a voltage level of the substantially fixed-frequency voltage output from the AC-to-AC converter circuit for rectification;
   a uni-directional rectifier circuit coupled to the output windings of the poly-phase transformer and configured to convert poly-phase AC from the transformer output windings to direct current (DC);
   a grid-fault protection circuit configured to de-energize the second poly-phase circuit in the event of a fault on the DC side of the unidirectional rectifier circuit, wherein the grid-fault protection circuit includes a rectifier circuit coupled to the second poly-phase circuit, the rectifier circuit being combined with a thyristor and a crowbar resistor, wherein the second poly-phase circuit is de-energized by firing the thyristor and dissipating energy in the crowbar resistor; and a backup power source coupled to the AC generator and configured to power the turbine generator system during startup, wherein the backup power source includes a battery coupled to the doubly-fed AC generator with a battery inverter circuit, wherein the backup power source further comprises a flywheel mechanically coupled to the AC generator, wherein the battery is arranged to power the flywheel.

2. The turbine generator system of claim 1, wherein the doubly-fed AC generator is one of the following:
a wound-rotor induction generator with slip rings;
a dual-stator winding, squirrel-cage induction generator;
a dual-stator winding, synchronous reluctance generator; and
a wound-rotor induction generator with brushless excitation.

3. The turbine generator system of claim 1, wherein the AC-to-AC converter circuit is an indirect converter comprising a poly-phase AC-to-DC converter, a poly-phase DC-to-AC converter, and a DC link between the poly-phase AC-to-DC converter and the poly-phase DC to-AC converter.

4. The turbine generator system of claim 1, wherein the AC-to-AC converter is configured to convert a variable-voltage, variable-frequency, output of the second poly-phase circuit to a substantially fixed frequency output at the input windings of the poly-phase transformer.

5. The turbine generator system of claim 4, wherein the substantially fixed frequency output is at a frequency between about 40 Hz and about 600 Hz.

6. The turbine generator system of claim 5, wherein the substantially fixed frequency output is at a frequency greater than about 100 Hz.

7. The turbine generator system of claim 1, wherein the AC-to-AC converter circuit has a power rating of less than about 40% of the power rating of the doubly-fed AC generator.

8. The turbine generator system of claim 1, wherein the uni-directional rectifier circuit is connected to the output windings of the poly-phase transformer via a protection device.

9. The turbine generator system of claim 1, wherein the uni-directional rectifier circuit is a multi-pulse rectifier circuit.

10. The turbine generator system of claim 1, wherein at least the converter circuit, the poly-phase transformer, and the uni-directional rectifier circuit are enclosed within a single housing or within a tower structure.

11. A power generation system comprising:
a plurality of turbine generator systems configured to provide direct current (DC) power via respective DC buses; and
a collection circuit connected to each of the DC buses and configured to combine the provided DC power;
wherein each of one or more of the turbine generator systems comprises
a doubly-fed alternating-current (AC) generator having a first poly-phase circuit and a second poly-phase circuit;
a poly-phase AC-to-AC converter circuit coupled between the first poly-phase circuit and the second poly-phase circuit configured to produce a substantially fixed-frequency voltage output;
a poly-phase transformer having input windings coupled to the first poly-phase circuit and having output windings, wherein the poly-phase transformer is configured to increase a voltage lever of the substantially fixed-frequency voltage output from the AC-to-AC converter circuit for rectification;
a uni-directional rectifier circuit coupled to the output windings of the poly-phase transformer and configured to convert poly-phase AC from the transformer output windings to direct current (DC); and
a backup power source coupled to the doubly-fed AC generator and configured to power the turbine generator system during startup, wherein the backup power source includes at battery coupled to the doubly-fed AC generator via a battery inverter circuit, wherein the backup power source further comprises a flywheel mechanically coupled to the AC generator, wherein the battery is arranged to power the flywheel.

12. The power generation system of claim 11, wherein the collection circuit further comprises a converter circuit configured to transform the combined DC power to AC or to a DC voltage different from the DC voltage of the combined DC power.

13. The power generation system of claim 11, wherein each of the one or more of the turbine generator systems comprises:
a grid-fault protection circuit configured to de-energize the second poly-phase circuit in the event of a fault on the DC side of the uni-directional rectifier circuit, wherein the grid-fault protection circuit includes a rectifier circuit coupled to the second poly-phase circuit, the rectifier circuit being combined with a thyristor and a crowbar resistor, wherein the second poly-phase circuit is de-energized by firing the thyristor and dissipating energy in the crowbar resistor.

14. A method for direct-current (DC) power generation, the method comprising:
providing a doubly-fed alternating-current (AC) generator having a first poly-phase circuit and a second poly-phase circuit and having as poly-phase AC-to-AC converter circuit coupled between the first poly-phase circuit and the second polyphase circuit, such that the doubly-fed AC generator and the converter circuit are configured to provide a substantially fixed-frequency voltage output;
powering the doubly-fed AC generator with a backup power source that includes a battery coupled to the doubly-fed AC generator with a battery inverter circuit, wherein the backup power source further comprises a flywheel mechanically coupled to the AC generator, wherein the battery is arranged to power the flywheel;
increasing a voltage level from the substantially fixed-frequency voltage output sufficiently for rectification to provide power to a DC transmission line;
converting the increased voltage level to a direct-current (DC) voltage, using a rectifier circuit that is co-located with the doubly-fed AC generator and the converter circuit; and
applying the DC voltage to is DC transmission line.

15. The method of claim 14, wherein the doubly-fed AC generator is one of the following:
a wound rotor induction generator with slip rings;
a dual-stator winding, squirrel-cage induction generator;
a dual-stator, synchronous reluctance generator; and
a wound-rotor induction generator with brushless excitation.

16. The method of claim 14, wherein increasing the voltage level from the substantially fixed-frequency voltage output comprises providing a poly-phase transformer having input windings coupled to the first poly-phase circuit of the AC generator and having output windings coupled to the uni-directional rectifier circuit.

17. The method of claim 16, wherein converting the increased voltage to a direct-current (DC) voltage comprises providing a uni-directional rectifier circuit co-located with the AC-to-AC converter circuit and the transformer, coupled to the output windings of the polyphase transformer, and configured to convert AC from the transformer output windings to direct current (DC).

18. The method of claim 14, wherein the AC-to-AC converter circuit is an Indirect converter comprising a poly-phase AC-to-DC converter, a poly-phase DC-to-AC converter, and a DC link between the poly-phase AC-to-DC converter and the poly-phase DC-to-AC converter.

19. The method of claim 14, wherein the AC-to-AC converter circuit is configured to convert a variable voltage, variable frequency, output of the rotor windings to a substantially fixed frequency output at the input windings of the three-phase transformer.

20. The method of claim 19, wherein the substantially fixed frequency output is at a frequency between about 100 Hz and About 600 Hz.

21. The method of claim 14, wherein the AC-to-AC converter circuit has a power rating of less than about 40% of the power rating of the doubly-fed AC generator.

22. The method of claim 14, further comprising de-energizing the second poly-phase circuit via a grid fault protection circuit connected thereto in response to a fault on the DC side of the uni-directional rectifier circuit, wherein the grid-fault protection circuit includes a rectifier circuit combined with a thyristor and a crowbar resistor, wherein the second poly-phase circuit is de-energized by firing the thyristor and dissipating energy in the crowbar resistor.

* * * * *